United States Patent
Yasuda

(10) Patent No.: US 10,928,358 B2
(45) Date of Patent: Feb. 23, 2021

(54) MASS SPECTROMETER USING JUDGEMENT CONDITION FOR DISPLAY

(71) Applicant: SHIMADZU CORPORATION, Kyoto (JP)

(72) Inventor: Hiroyuki Yasuda, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 187 days.

(21) Appl. No.: 16/085,203

(22) PCT Filed: Mar. 16, 2016

(86) PCT No.: PCT/JP2016/058370
§ 371 (c)(1),
(2) Date: Sep. 14, 2018

(87) PCT Pub. No.: WO2017/158770
PCT Pub. Date: Sep. 21, 2017

(65) Prior Publication Data
US 2019/0025253 A1   Jan. 24, 2019

(51) Int. Cl.
*G01N 27/62*    (2006.01)
*H01J 49/00*   (2006.01)
(Continued)

(52) U.S. Cl.
CPC ......... *G01N 27/62* (2013.01); *G01N 30/7206* (2013.01); *G01N 30/7233* (2013.01);
(Continued)

(58) Field of Classification Search
CPC ............... G01N 27/62; G01N 30/7206; G01N 30/7233; H01J 49/004–009
See application file for complete search history.

(56) References Cited

U.S. PATENT DOCUMENTS 6,362,473 B1 * 3/2002 Germanus ............. H01J 9/0036
                                                                 250/282
2007/0284520 A1   12/2007 Yamamoto
(Continued)

FOREIGN PATENT DOCUMENTS

JP   2007-309661 A   11/2007
JP   2012-225862 A   11/2012

OTHER PUBLICATIONS

International Search Report of PCT/JP2016/058370 dated May 10, 2016.
(Continued)

*Primary Examiner* — Natalie Huls
(74) *Attorney, Agent, or Firm* — Sughrue Mion, PLLC

(57) ABSTRACT

Under the control of a DDA (data dependent acquisition) execution controller (281), LC/MS$^n$ analysis data are acquired with a measurement unit (1) and stored in a measurement data storage section (23). In the case where the MS$^n$ analysis is automatically performed, a precursor ion intensity, TIC value and BPC value are also stored and related to the measurement data. In an analysis of the data, a spectrum display condition setter (25) displays, on a display unit (4), a setting window for allowing an analysis operator to enter a precursor ion intensity threshold as well as a product ion intensity threshold which is either the TIC or BPC value, and stores the entered values as a judgment condition in a spectrum display condition storage section (26). When an appropriate retention time is specified on a chromatogram displayed on the screen of the display unit (4), and if MS$^n$ spectrum data has already been acquired at that retention time, a spectrum judgment section (27) determines whether or not the precursor ion intensity and other relevant data related to the MS$^n$ spectrum data satisfy the judgment condition and selectively displays, on the screen of the display unit (4), only MS$^n$ spectra that satisfy the
(Continued)

judgment condition. By this operation, useless MS$^n$ spectra with low ion intensities are excluded from the display.

6 Claims, 4 Drawing Sheets

(51) Int. Cl.
  *G01N 30/72* (2006.01)
  *H01J 49/04* (2006.01)
(52) U.S. Cl.
  CPC ........ *H01J 49/004* (2013.01); *H01J 49/0036* (2013.01); *H01J 49/04* (2013.01)

(56) References Cited

U.S. PATENT DOCUMENTS

| | | | |
|---|---|---|---|
| 2009/0192719 A1* | 7/2009 | Kincaid | G16B 45/00 702/19 |
| 2009/0302210 A1* | 12/2009 | Castro-Perez | H01J 49/0045 250/282 |
| 2011/0288779 A1* | 11/2011 | Satulovsky | H01J 49/0031 702/19 |
| 2012/0191369 A1* | 7/2012 | Yamaguchi | H01J 49/0036 702/23 |
| 2013/0297230 A1* | 11/2013 | Kawase | H01J 49/0036 702/32 |
| 2014/0014833 A1* | 1/2014 | Sekiya | G01N 30/72 250/288 |
| 2015/0090874 A1* | 4/2015 | Larson | H01J 49/061 250/282 |
| 2015/0130810 A1* | 5/2015 | Yasuda | G06T 11/206 345/440 |
| 2015/0318154 A1* | 11/2015 | Campbell | H01J 9/022 250/282 |
| 2016/0033458 A1 | 2/2016 | Maeda | |
| 2016/0092151 A1* | 3/2016 | Yasuda | H01J 49/0036 345/440 |
| 2016/0238577 A1* | 8/2016 | Yamaguchi | G01N 30/463 |
| 2018/0108521 A1* | 4/2018 | Campbell | H01J 49/0081 |

OTHER PUBLICATIONS

Communication dated May 8, 2020 from the State Intellectual Property Office of the P.R.C. in Application No. 201680083648.7.

* cited by examiner

MASS SPECTROMETER USING JUDGEMENT CONDITION FOR DISPLAY

CROSS REFERENCE TO RELATED APPLICATIONS

This application is a National Stage of International Application No. PCT/JP2016/058370 filed Mar. 16, 2016.

TECHNICAL FIELD

The present invention relates to a mass spectrometer capable of an $MS^n$ analysis (where n is an integer equal to or greater than two), and more specifically, to a mass spectrometer suitable for a chromatograph mass spectrometer in which a mass spectrometer is used as the detector for a liquid chromatograph (LC) or gas chromatograph (GC).

BACKGROUND ART

In a triple quadrupole mass spectrometer, ion trap mass spectrometer or ion trap time-of-flight mass spectrometer, an MS/MS (=$MS^2$) spectrum can be created by selecting, as a precursor ion, an ion having a specific mass-to-charge ratio m/z from various ions originating from a component to be analyzed, dissociating the precursor ion by collision induced dissociation (CID), and performing a mass spectrometric analysis on the generated product ions. In the case of the ion trap mass spectrometer or ion trap time-of-flight mass spectrometer, an $MS^n$ spectrum with n being equal to or greater than three can also be created by repeating the selection and CID of an ion a plurality of times and performing a mass spectrometric analysis on the eventually obtained product ions. In the following description, a mass spectrometer capable of an $MS^n$ analysis with n being equal to or greater than two is simply called the "mass spectrometer" unless otherwise noted.

In the case of performing a qualitative determination or structural analysis on an unknown component in a sample using a chromatograph mass spectrometer, such as an LC-MS or GC-MS which employs a mass spectrometer as the detector for an LC or GC, neither the retention time of the component nor the mass-to-charge ratio of a precursor ion originating from the component is previously known. In such a case, it is convenient to detect each component contained in a sample and automatically execute an $MS^n$ analysis during the elution period of the component if a component which is significant or is considered to be significant has been detected. For example, mass spectrometers described in Patent Literature 1, 2 or other related documents have the function of automatically selecting a precursor ion which satisfies a preset condition from mass spectrum data obtained by a normal $MS^1$ analysis without dissociation of the ion, and performing an $MS^n$ analysis on the selected precursor ion in real time. With this function, an $MS^n$ spectrum for a component in a sample can be acquired even if there is only a limited period of time during which the component is introduced into the mass spectrometer, as in the LC-MS or GC-MS. Such a function is generally called the "data dependent acquisition (DDA)", "auto-$MS^n$" or the like. The term "DDA" will be used in the following description.

In the case of collecting data by DDA, it is necessary to set the condition for the selection of the precursor ion before the execution of the measurement. As disclosed in Patent Literature 1 or 2, the mass-to-charge ratio and/or signal intensity is often used in the precursor ion selection condition, such as an ion falling within a specific range of mass-to-charge ratios or an ion having a signal intensity equal to or higher than a predetermined threshold. In some cases, the selection of the precursor ion based on the mass-to-charge ratio and/or signal intensity is performed after the filtering of the ions by the monoisotopic peak or valence, or after the exclusion or preferential selection of specific ions. In any case, in the DDA, if an ion peak which satisfies a precursor ion selection condition that has been preset in the previously described manner has been observed on a mass spectrum ($MS^{n-1}$ spectrum), the $MS^n$ analysis using that ion as the precursor ion is executed, whereas the execution of the $MS^n$ analysis is withheld at least for the moment if no ion peak is observed which satisfies the precursor ion selection condition.

Normally, for a chromatograph mass spectrometer, a computer on which a dedicated data-processing software program is installed is used to process and analyze data collected by DDA in the previously described manner. On such a software program, a mass ($MS^1$) spectrum at a retention time specified by an analysis operator and an $MS^n$ spectrum for a precursor ion automatically selected based on the specified mass spectrum are displayed in an arrayed form on the same display area. For example, FIG. 4 in Patent Literature 2 shows an example in which the three mass spectra of $MS^1$, $MS^2$ and $MS^3$ at a specific retention time are displayed in an arrayed form within a spectrum display area on a screen. Information concerning the mass-to-charge ratios of product ions obtained in an $MS^n$ analysis is particularly useful for understanding the chemical structure of a compound having a high molecular weight. An analysis operator checks the displayed mass spectra obtained in multiple stages and conducts a qualitative determination or structural analysis for a target component based on various kinds of information obtained from those mass spectra.

Conventional devices display all mass spectra acquired by DDA, even in the case where no ion has been observed or no ion intensity has reached a sufficiently high level. FIG. 6 shows one example of a mass spectrometric data analysis window in a conventional device. In this example, $MS^1$ to $MS^4$ spectra acquired by DDA at a specific retention time are displayed in a spectrum display area 63. Ions with sufficiently high intensities are observed on each of the $MS^1$ to $MS^3$ spectra, whereas ions are barely observed on the $MS^4$ spectrum. In the conventional device, even such a mass spectrum which cannot be used or is difficult to be used for a data analysis is also displayed along with the other mass spectra. The analysis operator needs to check through all mass spectra, including such an insignificant one. This constitutes a factor that lowers the efficiency of the analyzing task. Furthermore, since there is only a limited space for the spectrum display area on the screen of the display unit, the display of a useless mass spectrum causes a decrease in the display size of the useful mass spectra on which sufficient ion intensities have been achieved, or a decrease in the size of another display area shown on the same display area (in the example of FIG. 6, the chromatogram display area 61 or spectrum tree display area 62). Consequently, the mass-to-charge-ratio values on the mass spectra or other items of information becomes difficult to read, or details of the chromatogram curve become difficult to recognize. These factors also lower the efficiency of the analyzing task.

CITATION LIST

Patent Literature

Patent Literature 1: JP 2007-309661 A
Patent Literature 2: JP 2012-225862 A

SUMMARY OF INVENTION

Technical Problem

The present invention has been developed to solve the previously described problem. Its objective is to provide a mass spectrometer in which mass spectra created from data collected by DDA can be displayed in a more sophisticated manner to help analysis operators more efficiently perform an analyzing task when analyzing and processing the data for a qualitative determination, structural analysis or similar purposes.

Solution to Problem

The present invention developed for solving the previously described problem is a mass spectrometer capable of data dependent acquisition (DDA) in which an $MS^m$ spectrum is acquired by performing an $MS^m$ analysis using, as a precursor ion, a specific ion observed on an $MS^{m-1}$ spectrum acquired by an $MS^{m-1}$ analysis, where in represents all integers ranging from two to n, where n is an integer equal to or greater than two, and the mass spectrometer including:

a) a display condition storage section for storing, as a filtering condition for a spectrum display, a judgment condition concerning one or both of the signal intensity of the precursor ion observed on the $MS^{m-1}$ spectrum for the $MS^m$ analysis and the signal intensity of all or some of the duct ions observed on the $MS^m$ spectrum;

b) a judgment section for determining, for each of one or more $MS^m$ spectra originating from one component created from data collected by data dependent acquisition, whether or not the signal intensity of the precursor ion and/or the product ions satisfies the judgment condition stored in the display condition storage section; and c) a spectrum display processor for displaying, in an arrayed form on the same display area, $MS^m$ spectra originating from one component which have been judged by the judgment section as satisfying the judgment condition.

The mass spectrometer according to the present invention is particularly suitable for a liquid chromatograph mass spectrometer (LC-MS) or gas chromatograph mass spectrometer (GC-MS) in which a liquid chromatograph or gas chromatograph is connected in the previous stage of the mass spectrometer.

In the mass spectrometer according to the present invention, for example, if n=4, the $MS^m$ analysis is performed to a maximum of $MS^4$ analysis in the DDA. In that case, a collection of data which form the four mass spectra of $MS^1$, $MS^2$, $MS^3$ and $MS^4$ are acquired for one component. There is no limitation on the value of n, although a maximum value of n is practically 5 or 6.

For example, after checking the $MS^m$ spectra created from the collected data and displayed on the display area, an analysis operator using a keyboard or other input devices enters the judgment condition concerning one or both of the signal intensity of the precursor ion observed on the $MS^{m-1}$ spectrum for the $MS^m$ analysis and the signal intensity of all or some of the product ions observed on the $MS^m$ spectrum, and issues a command to store the judgment condition in the display condition storage section as the filtering condition for the spectrum display. A typical judgement condition is a lower threshold of the signal intensity. As for the signal intensity of the product ions, either the total ion current (TIC) value, i.e. the total value of the signal intensities of all product ions observed on the $MS^m$ spectrum, or the signal intensity value of an ion observed as the base peak on the $MS^m$ spectrum, i.e. the highest signal-intensity value on the spectrum, may preferably be used.

With the judgment condition stored in the display condition storage section in the previously described manner, a data-analyzing task is performed, in which, for example, a set of data to be displayed is specified by the analysis operator, or a retention time is specified in the case of an LC-MS or GC-MS, Then, the judgment section classifies mass spectra into those which need to be displayed and those which do not need to be displayed, based on the judgment condition stored in the display condition storage section. That is to say, for each of the $MS^m$ spectra created based on the specified data or on the data acquired at the specified retention time, the judgment section determines whether or not the signal intensity of the precursor ion and/or the product ions satisfies the judgement condition. The spectrum display processor excludes $MS^m$ spectra which do not satisfy the judgment condition and displays the remaining $MS^m$ spectra in an arrayed form on the same display area.

For example, in the case where the lower limit of the signal intensity of the precursor ion is set as the judgment condition, the judgment section determines whether or not the signal intensity value of the precursor ion observed on an $MS^{m-1}$ spectrum and selected for an $MS^m$ analysis is equal to or higher than the lower limit. If the signal intensity value is less than the lower limit, the judgment section determines that the $MS^m$ spectrum in question does not need to be displayed. In the case where the lower limit of the total value of the signal intensities of the product ions (TIC value) is set as the judgment condition, the judgment section determines whether or not the total value of the signal intensities of all product ions observed on an $MS^m$ spectrum is equal to or higher than the lower limit. If the TIC value is less than the lower limit, the judgment section determines that the $MS^m$ spectrum in question does not need to be displayed.

In this manner, the mass spectrometer according to the present invention selectively displays significant $MS^m$ spectra which satisfy the judgment condition that has been set, for example, by an analysis operator, rather than displaying all $MS^m$ spectra which can be visually presented based on the data collected by DDA.

The judgment condition used for judging an $MS^m$ spectrum may be independently set for each stage of the ion dissociation if n is equal to or greater than three, i.e. if there are two or more $MS^m$ spectra originating from one component. More specifically, for example, the value which is set in the judgment condition for the $MS^2$ spectrum may be different from the value which is set in the judgment condition for the $MS^3$ spectrum.

Normally, the components contained in a measurement target sample vary in quantity. There may be a component which forms a low peak on a mass spectrum yet needs to be observed, or conversely, there may be a component which forms a high peak on a mass spectrum yet does not need to be observed. Accordingly, it is preferable to allow for an individual setting of the judgment condition for the spectrum display for each component so that one judgment condition can set for the $MS^1$ to $MS^n$ spectra originating from one component obtained by DDA while a different judgment condition can be set for the $MS^1$ to $MS^n$ spectra originating from another component.

This configuration makes it possible to properly divide mass spectra, for each component, into a group which needs to be displayed and another group which does not need to be displayed, so as to selectively display only mass spectra that need to be observed or analyzed.

In the mass spectrometer according to the present invention, the calculation of the signal intensity value of the precursor ion, total value of the signal intensities of the product ions, signal intensity value of the base peak or other necessary information, based on the data specified for the display or data acquired at a specified retention time, may be performed after the data or retention time has been specified by the analysis operator, i.e. in the process of displaying mass spectra for a data analysis. However, for a quick presentation of the mass spectra, it is more convenient that the aforementioned signal intensity values used for determining whether or not a mass spectrum needs to be displayed are calculated during the data collection, i.e. during the execution of the measurement.

Accordingly, in a preferable configuration of the present invention, the mass spectrometer further includes:

d) a characteristic value storage section for calculating a signal intensity value of the precursor ion, a total value of the signal intensities of all product ions observed on an $MS^m$ spectrum, and a signal intensity value of an ion which is a base peak observed on the $MS^m$ spectrum, and for storing the calculated values, based on the acquired data during a data collection by data dependent acquisition, and the judgment section is configured to use the values stored in the characteristic value storage section in determining whether or not the signal intensity of the precursor ion and/or the product ions satisfies the judgement condition.

According to this configuration, when spectra are to be displayed, the judgment section can use the values stored in the characteristic value storage section to quickly determine, for each $MS^m$ spectrum, whether or not the $MS^m$ spectrum needs to be displayed. Thus, only the significant $MS^m$ spectra can be quickly presented on a display screen.

In many cases, a measurement target sample contains unknown kinds of components in unknown quantities, and therefore, it is impossible to determine the judgment condition for the spectrum display and store it in the display condition storage section before the execution of the measurement. However, if the kinds of components contained in a sample and their respective contents are previously known or can be estimated to a certain degree, it is possible to previously determine the judgment condition for the spectrum display and store it in the display condition storage section before the execution of the measurement. Although the judgment condition stored in the display condition storage section is intended for use in the spectrum display process, it is possible to make the judgment condition retrievable at any point in time so that it can also be used in the data acquisition process, i.e. during the execution of the measurement, for the selection of the precursor ion or determination on whether or not an $MS^m$ analysis needs to be performed. For example, when the data collection is performed using the same DDA operation for the same sample or similar samples, the stored judgment condition can be used to omit an acquisition of data which do not need to be displayed and collect data which are easy to analyze.

Advantageous Effects of Invention

With the mass spectrometer according to the present invention, it is possible to display only significant $MS^m$ spectra in an arrayed form on the screen of the display unit by excluding, for example, $MS^m$ spectra on which ions are barely observed or $MS^m$ spectra on which only ions with low signal intensities are observed, from the $MS^m$ spectra which can be created based on the data collected by DDA. Therefore, analysis operators do not need to check useless $MS^m$ spectra in a data-analyzing task for the quantitative determination or structural analysis of a component. Since unnecessary $MS^m$ spectra are not displayed within the limited space on the screen of the display unit, a larger area can be secured for the display of the significant $MS^m$ spectra or the display of other relevant information, such as a chromatogram, so that those $MS^m$ spectra and other relevant information become more visible or readable. This improves the efficiency of the data-analyzing task as well as helps analysis operators make fewer errors in viewing or reading the displayed information.

DESCRIPTION OF EMBODIMENTS

Figure 1:
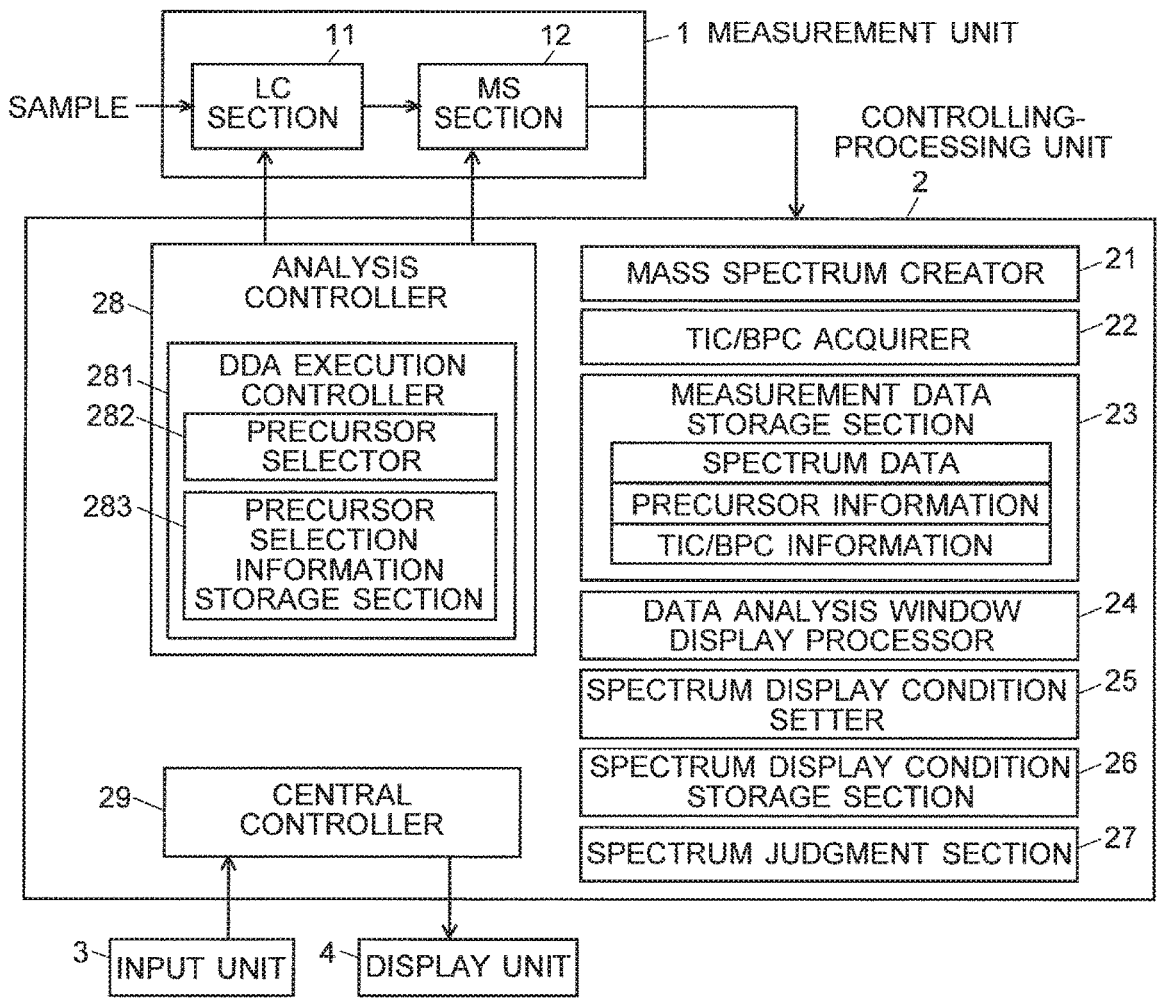
FIG. 1 is a schematic configuration diagram of one embodiment of an LC-MS system including a mass spectrometer according to the present invention.

One embodiment of an LC-MS system using a mass spectrometer according to the present invention is hereinafter described with reference to the attached drawings. FIG. 1 is a schematic configuration diagram of the LC-MS system according to the present embodiment.

As shown in FIG. 1, the LC-MS system according to the present embodiment includes a measurement unit 1, controlling-processing unit 2, input unit 3 and display unit 4. The measurement unit 1 includes a liquid chromatograph (LC section) 11 in which a plurality of components contained in a liquid sample are temporally separated from each other, and a mass analyzer (MS section) 12 in which the separated components are further separated according to their mass-to-charge ratios m/z and detected. For example, the MS section 12 is a mass spectrometer which is provided with an ion source employing an atmospheric pressure ionization method, such as the electrospray ionization, and is capable of an $MS^n$ analysis, where n is an integer equal to or greater than three. For example, it may be an ion trap time-of-flight mass analyzer or ion trap mass spectrometer. A triple quadrupole mass spectrometer, Q-TOF mass spectrometer, or TOF/TOF mass spectrometer may also be used as the MS section 12, since this section only needs to be capable of an MS$^n$ analysis with n being an integer equal to or greater than two.

The controlling-processing unit 2 includes, as its functional blocks, a mass spectrum creator 21, TIC/BPC acquirer 22, measurement data storage section 23, data analysis window display processor 24, spectrum display condition setter 25, spectrum display condition storage section 26, spectrum judgment section 27, analysis controller 28 including a DDA execution controller 281, and central controller 29. The DDA execution controller 281 includes a precursor selector 282 and a precursor selection information storage section 283. Typically, the actual form of the controlling-processing unit 2 is a personal computer, with the aforementioned functional blocks embodied by executing, on this computer, a dedicated data-processing and controlling software program previously installed on the same computer.

An operation for carrying out a data collection in the LC-MS system according to the present embodiment is hereinafter described.

Figure 2:
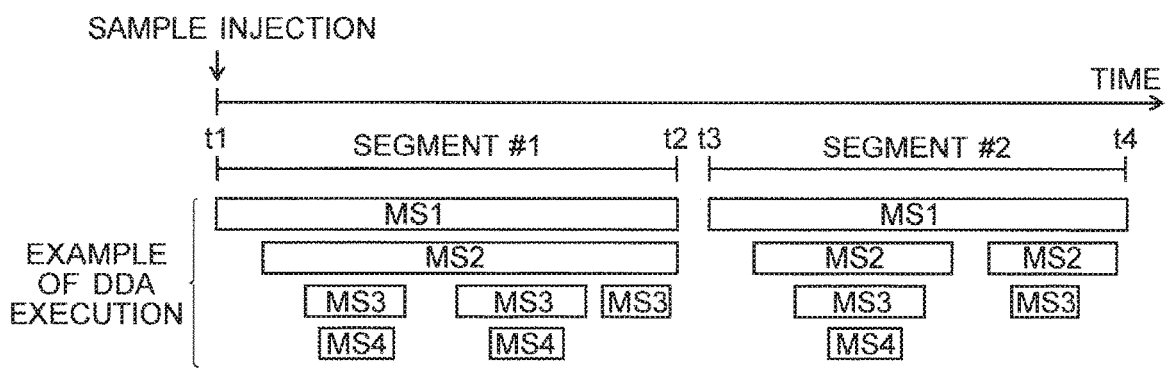
FIG. 2 is a conceptual diagram of a data collection by DDA in the LC-MS system according to the present embodiment.

Before an execution of a measurement, an analysis operator sets various measurement conditions including a precursor ion selection condition from the input unit 3. FIG. 2 is a conceptual diagram of the data collection by DDA in the LC-MS system according to the present embodiment. In the present embodiment, one or more segments are set within a time range from the point in time of the initiation of the measurement (injection of a sample) to the point in time of the completion of the measurement. For each segment, a precursor ion selection condition can be set along with other measurement conditions, such as the range of mass-to-charge ratios for a scan measurement in an MS$^1$ analysis. For example, the precursor ion selection condition may be such that the signal intensity of a peak observed on a mass spectrum should exceed a predetermined threshold, and the peak should have a specific mass-to-charge ratio or fall within a specific range of mass-to-charge ratios. It is also possible to set a precursor ion selection condition which requires that all mass-to-charge ratios described in a previously set exclusion list should be excluded regardless of the signal intensity, or which requires that all ions described in a priority list should be adopted regardless of their signal intensities. The precursor selection condition set by the analysis operator in this manner is stored in the precursor selection information storage section 283.

Upon receiving a command to initiate a measurement using the DDA function according to the measurement conditions which have been set in this manner, the DDA execution controller 281 in the analysis controller 28 operates the measurement unit 1 to initiate the measurement. A liquid sample is introduced into the LC section 11 at the predetermined timing. While passing through a column (not shown) in the LC section 11, the components in the sample are temporally separated from each other and eluted. The MS section 12 ionizes each component in the eluate from the LC unit 11 and repeatedly performs a scan measurement over a predetermined range of mass-to-charge ratios at fixed intervals of time.

The mass spectrum creator 21 creates one mass spectrum (MS$^1$ spectrum) based on the data acquired by one scan measurement. For each ion peak observed on the obtained mass spectrum, the precursor selector 282 attempts an automatic selection of a precursor ion according to the precursor ion selection condition prepared in the previously described manner and stored in the precursor selection information storage section 283. If an ion which satisfies the precursor ion selection condition has been located, an MS$^2$ analysis (product ion scan measurement) using that ion as the precursor ion is subsequently performed after the MS$^1$ analysis. Based on the data acquired by this MS$^2$ analysis, the mass spectrum creator 21 creates an MS$^2$ spectrum which covers a predetermined range of mass-to-charge ratios. The precursor selector 282 searches the ions observed on this MS$^2$ spectrum for an ion which satisfies the precursor ion selection condition in a similar manner to the previous one. An MS$^3$ analysis, followed by an MS$^4$ analysis, will also be similarly performed as long as an ion which satisfies the precursor ion condition is present.

Through the repetition of the scan measurement at predetermined intervals of time, a set of MS$^1$ spectrum data is obtained at each predetermined interval of time, and if there is an ion which satisfies the precursor ion selection condition, MS$^2$, MS$^3$ and even MS$^4$ spectrum data can also be obtained within a period of time until the next scan measurement. No analysis beyond MS$^4$ is performed in the present embodiment, although an MS$^n$ analysis with n=5 or greater may also be performed. The spectrum data collected in this manner are successively stored in the measurement data storage section 23.

While the previously described data collection is being performed, every time an ion which satisfies the precursor ion selection condition is located and an MS$^n$ analysis using that ion as the precursor ion is performed, the TIC/BPC acquirer 22 obtains the mass-to-charge ratio of that precursor ion, a total ion current signal value which equals the signal intensities of all ions observed on one MS$^n$ spectrum (TIC value), and a signal intensity value of the base peak which has the highest signal intensity among the ion peaks observed on the MS$^n$ spectrum (BPC value). Then, the TIC/BPC acquirer 22 relates those values to the spectrum data and stores them in the measurement data storage section 23.

Within each of the time ranges of t1 to t2 (period of segment #1) and t3 to t4 (period of segment #2) shown in FIG. 2, the MS$^1$ spectrum data is repeatedly collected in the previously described manner, and if a component has been located in the sample introduced into the MS section 12 and an ion derived from that component has been judged as satisfying the precursor ion selection condition, spectrum data are collected in each of the MS$^2$, MS$^3$ and MS$^4$ stages, and the collected data are compiled into a single data file and stored in the measurement data storage section 23. Additionally, the mass-to-charge-ratio value of the precursor ion, TIC value and BPC value obtained through an execution of an MS$^n$ analysis are stored in the same data file (or a separate file associated with the data file).

Hereinafter described is one example of the working and processing operation in the case where an operator carries out a data analysis based on the measurement data stored in the measurement data storage section 23 in the previously described manner in the LC-MS system according to the present embodiment.

Figure 6:
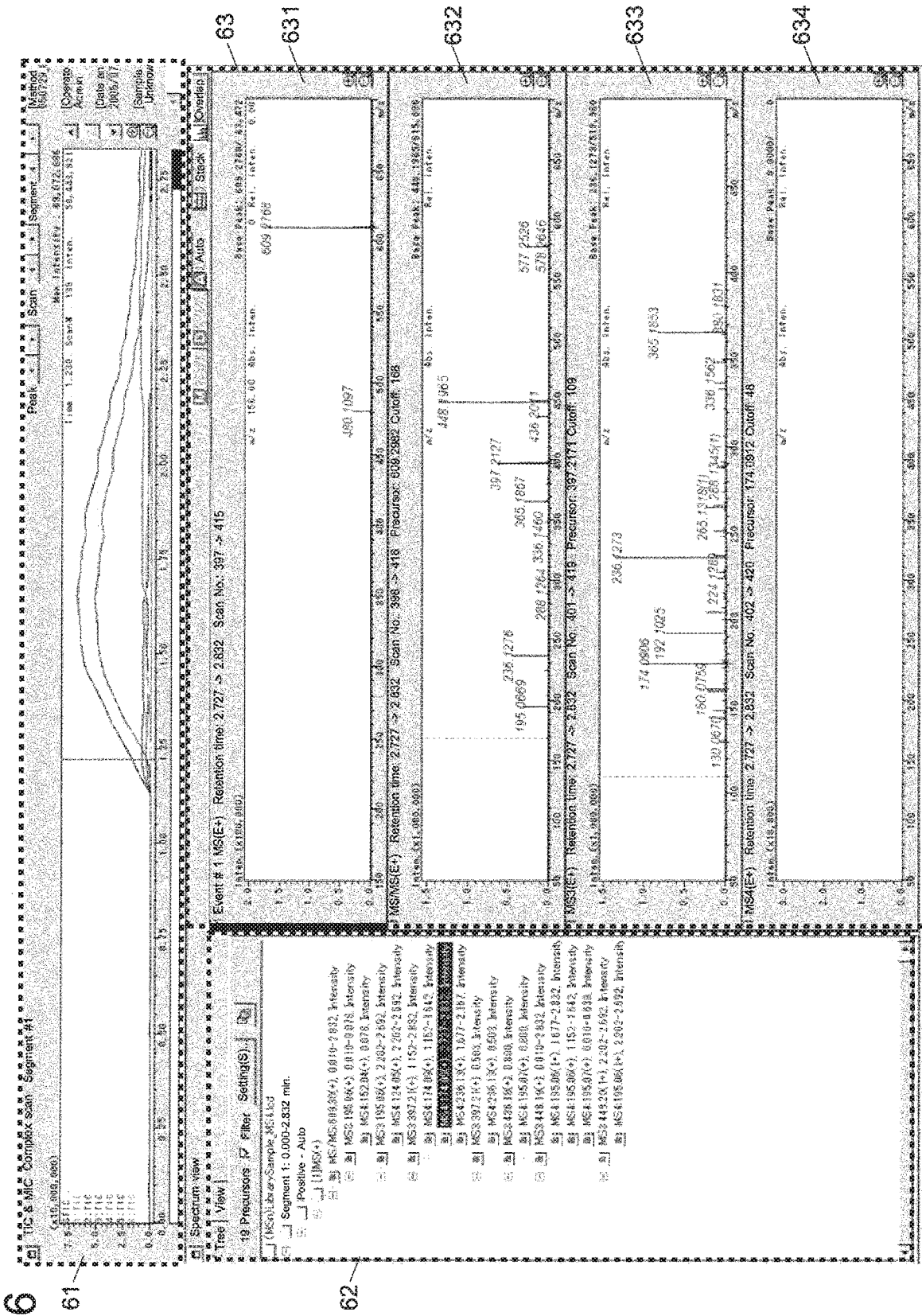
FIG. 6 is an image showing one example of a mass spectrometric data analysis window in a conventional LC-MS system.

The analysis operator using the input unit 3 specifies a data file to be analyzed and issues a command to display a data analysis window. Upon receiving this command, the data analysis window display processor 24 reads the specified data file from the measurement data storage section 23 and creates a total ion chromatogram based on the data in the data file. Then, the same processor displays the data analysis window as shown in FIG. 6 on the screen of the display unit 4. The following areas are arranged within the data analysis window a chromatogram display area 61 for displaying the total ion chromatogram or the like; a spectrum tree display area 62 for displaying a spectrum tree; a spectrum display area 63 for displaying mass spectra; and other areas. For example, when a specific retention time on the chromatogram displayed on the chromatogram display area 61 is indicated by the analysis operator, mass spectra based on the data collected at that retention time are displayed on the spectrum display area 63.

Figure 3A:
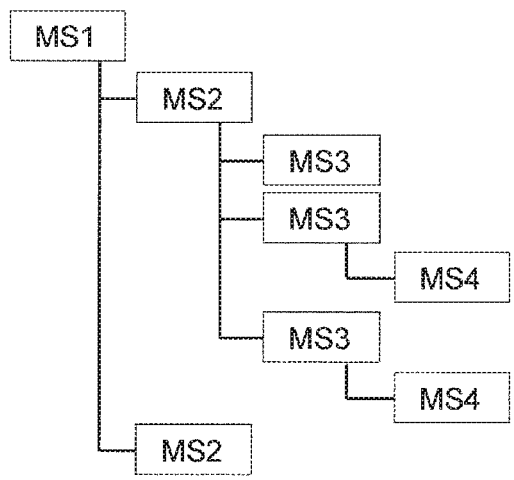
FIGS. 3A and 3B are schematic diagrams showing one example of a spectrum tree which is a tree structure showing the DDA execution condition and the relation of the thereby collected data in the LC-MS system according to the present embodiment.
Figure 3B:
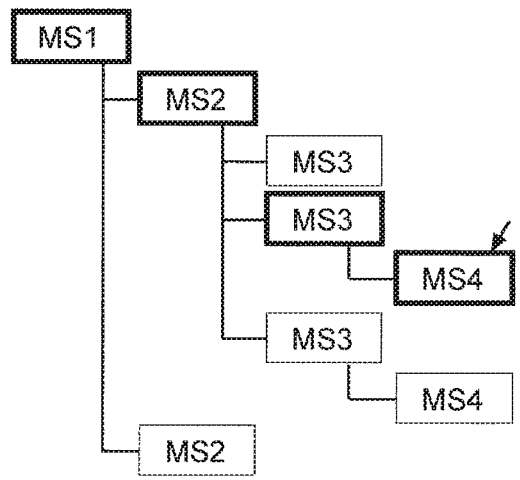

A brief description of the spectrum tree displayed in the spectrum tree display area 62 is as follows: A spectrum tree is a tree structure showing the DDA execution condition and the relation of the thereby collected data in one segment. The example of FIG. 3A demonstrates that two $MS^2$ analyses for precursor ions having different mass-to-charge ratios, or two $MS^2$ analyses covering different time ranges for a precursor ion having the same mass-to-charge ratio, have been performed based on the result (mass spectrum) obtained by an $MS^1$ analysis in one segment. Furthermore, the figure also shows that three $MS^3$ analyses for precursor ions having different mass-to-charge ratios, or three $MS^3$ analyses covering different time ranges for a precursor ion having the same mass-to-charge ratio, have been performed based on the result ($MS^2$ spectrum) obtained by one of those two $MS^2$ analyses. The series of $MS^1$, $MS^2$, $MS^3$ and $MS^4$ indicated by the thick lines in FIG. 3B demonstrates that there is a series of mass spectrum data obtained by DDA at least at one retention time. Accordingly, the LC-MS system according to the present embodiment is configured so that, when one of the $MS^4$ spectra at the lowest level is indicated by the analysis operator as shown by the arrow in FIG. 3B in the spectrum tree displayed in the spectrum tree display area 62, the mass spectra of $MS^1$, $MS^2$, $MS^3$ and $MS^4$ which can be traced back from the indicated $MS^4$ spectrum are individually displayed in the spectrum display area 63. The example in FIG. 6 shows such a display.

Figure 4:
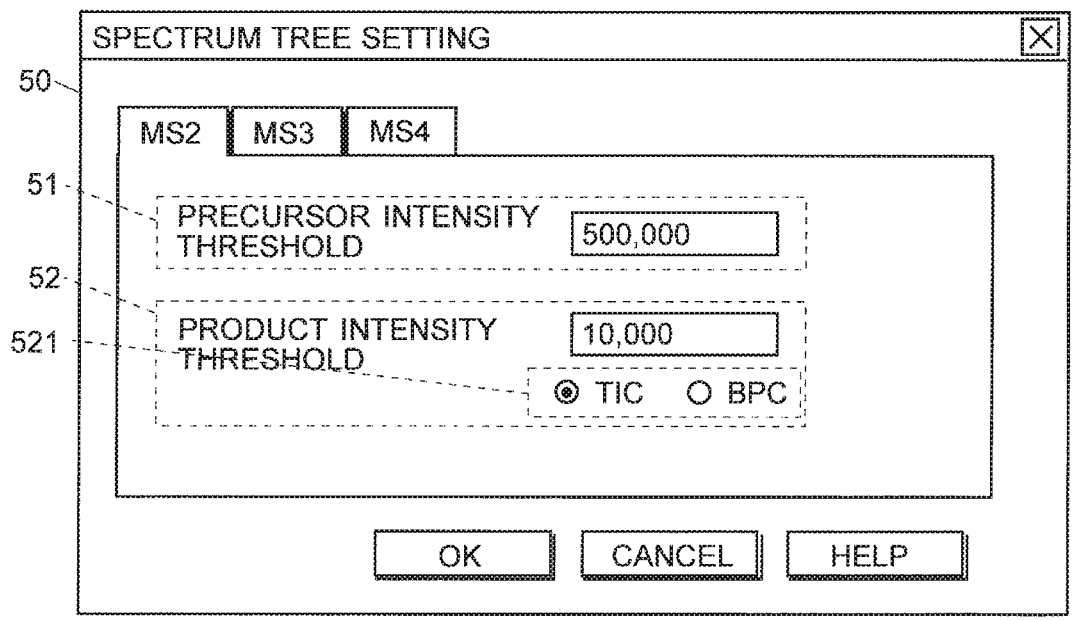
FIG. 4 is a diagram showing one example of a window for setting a spectrum display condition in the LC-MS system according to the present embodiment.

Some conventional devices are also capable of such a display. The LC-MS system according to the present embodiment additionally has characteristic functions, as will be hereinafter described. After checking the chromatogram, mass spectra and other items of information based on the specified data file, the analysis operator sets a spectrum display condition from the input unit 3. Specifically, the analysis operator performs a predetermined operation using the input unit 3. Upon this operation, the spectrum display condition setter 25 displays a spectrum display condition setting window 50 as shown in FIG. 4 on the screen of the display unit 4. The spectrum display condition setting window 50 is a window for setting, for each spectrum tree, or for each segment, the conditions (parameters) for narrowing down mass spectra to be displayed on the data analysis window. In the present example, a tabbed interface is used to enable the switching among the stages of the $MS^n$ analysis, i.e. $MS^2$ (MS/MS), $MS^3$ and $MS^4$, thereby allowing for an independent setting of the spectrum display condition for each stage. Such a function for the independent setting for each $MS^n$ analysis may be omitted.

As shown in FIG. 4, the spectrum display condition setting window 50 includes a precursor ion intensity threshold setting area 51 and a product ion intensity threshold setting area 52. An input box for entering a numerical value is located in each of those setting areas 51 and 52. A radio button 521 for selecting either the TIC value or the BPC value is located in the product ion intensity threshold setting area 52.

For example, if it is necessary to exclude, from the display, each $MS^2$ spectrum for which a precursor ion having a signal intensity less than Ia was used as the target, the analysis operator can enter the value of "Ia" in the input box in the precursor ion intensity threshold setting area 51. If it is necessary to exclude, from the display, each MS/MS spectrum having a TIC value less than Ib, the analysis operator can select the radio button of the "TIC value" (FIG. 4 shows this selection) in the product ion intensity threshold setting area 52 and enter the value of "Ib" in the input box in the same area 52. If it is necessary to exclude, from the display, each MS/MS spectrum having a BPC value less than Ic, the analysis operator can select the radio button of the "BPC value" in the product ion intensity threshold setting area 52 and enter the value of "Ic" in the input box in the same area 52. If it is unnecessary to perform the filtering of the mass spectra using the signal intensity of the precursor ion or product ions, the analysis operator can enter the numerical value of "0" in each input box (normally, "0" is set as the default value). If both the precursor ion intensity threshold and the product ion intensity threshold are set, any spectrum which does not satisfy both conditions will be excluded from the display.

After the completion of the previously described inputting task, the analysis operator clicks the "OK" button. Then, the spectrum display condition setter 25 fixes the input and stores it in the spectrum display condition storage section 26. The analysis operator can similarly set the spectrum display conditions for each of the $MS^3$ and $MS^4$ spectra. There is only one spectrum tree in FIG. 6 (and also in FIG. 5, which will be described later). However, it is possible that a plurality of spectrum trees, or segments, are present. In that case, one or both of the precursor ion intensity threshold and the product ion intensity threshold can be set for each segment as the spectrum display condition.

After the setting of the spectrum display condition is completed, the analysis operator using the input unit 3 performs a predetermined operation, or more specifically, issues a command to renew the display according to the spectrum display condition. Upon receiving this command, the spectrum judgment section 27 reads the measurement data acquired at the specified retention time as well as the mass-to-charge-ratio value of the precursor ion, TIC value and BPC value which are stored and related to the measurement data. Then, the spectrum judgment section 27 determines whether or not those values satisfy the spectrum display condition stored in the spectrum display condition storage section 26. As described earlier, the spectrum display condition is set for each of the $MS^2$, $MS^3$ and $MS^4$ spectra. Therefore, each of the mass spectra is tested as to whether or not it satisfies the spectrum display condition. A mass spectrum which has been judged as satisfying the spectrum display condition is classified as one which needs to be displayed, while a mass spectrum which has not been judged as satisfying the display condition is classified as one which does not need to be displayed.

Consider the case where a precursor ion intensity threshold of 500,000 and a product ion intensity threshold of 10,000 in terms of the TIC value have been set for $MS^2$ spectra, as shown in FIG. 4. If the precursor ion signal intensity value in the $MS^2$ analysis stored and related to the measurement data is equal to or greater than 500,000, and if the TIC value of the $MS^2$ spectrum is equal to or greater than 10,000, then the $MS^2$ spectrum will be classified as one which needs to be displayed. Even when the precursor ion signal intensity value in the $MS^2$ analysis is equal to or greater than 500,000, the $MS^2$ spectrum will be classified as one which does not need to be displayed if the TIC value of the $MS^2$ spectrum is less than 10,000. After all mass spectra at the specified retention time have been classified, the data analysis window display processor 24 creates mass spectrum display images for only the mass spectra which have been classified as those which needs to be displayed, and displays those images on the spectrum display area 63 on the data analysis window. If the space for the spectrum display area 63 is fixed, each mass spectrum display image will be appropriately scaled according to the number of mass spectra to be displayed on this area 63.

Figure 5:
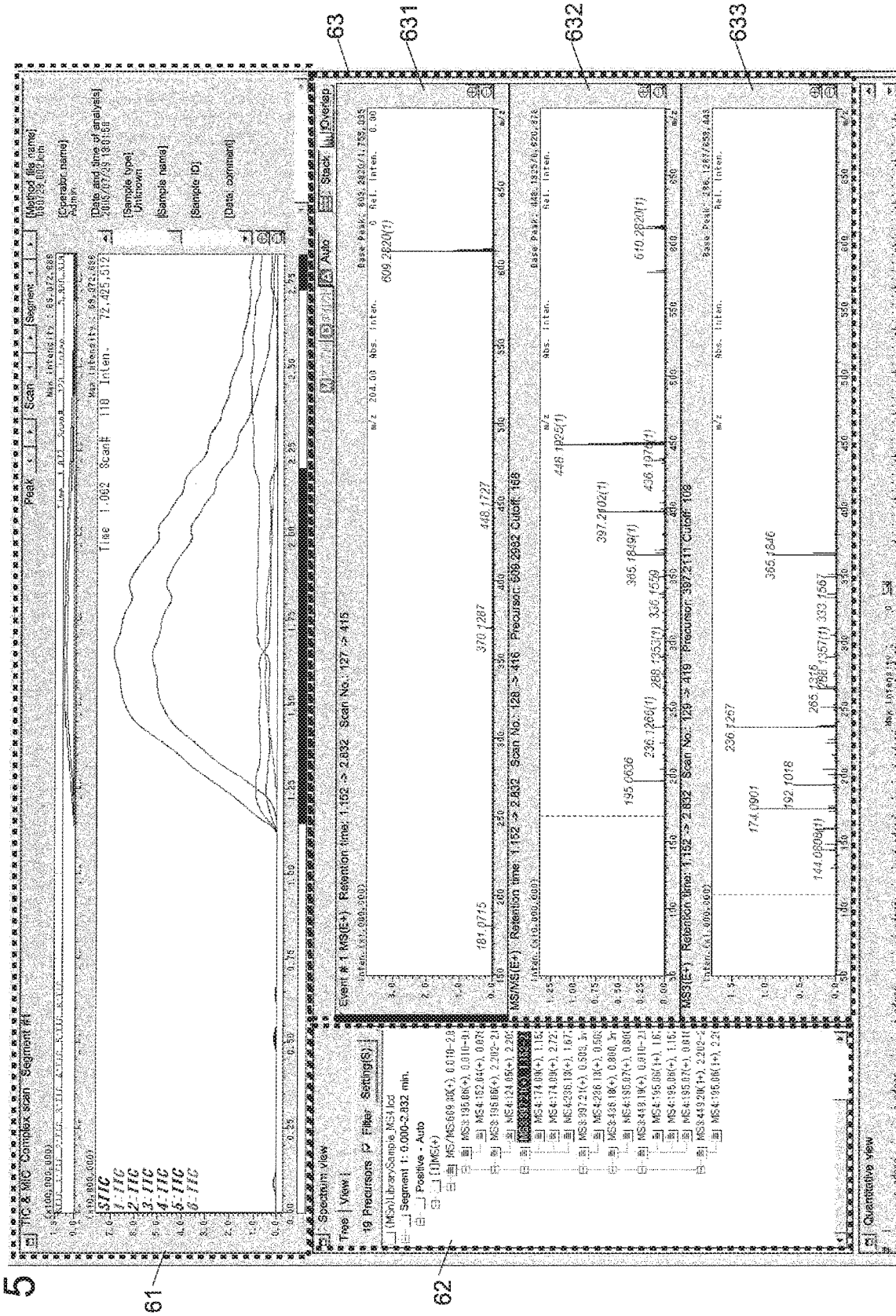
FIG. 5 is an image showing one example of a mass spectrometric data analysis window in the LC-MS system according to the present embodiment.

If either the precursor ion intensity threshold or the product ion intensity threshold, or both of them are appropriately set as the spectrum display condition for the $MS^4$ spectrum, an $MS^4$ spectrum on which ions are barely observed as in the $MS^4$ spectrum shown in FIG. 6 will be classified as one which does not need to be displayed. Therefore, in the LC-MS system according to the present embodiment, the mass spectra displayed in the spectrum display area 63 will be as shown in FIG. 5; i.e. the $MS^4$ spectrum on which ions are barely observed is not displayed, while the $MS^1$ spectrum 631, $MS^2$ spectrum 632 and $MS^3$ spectrum 633 which are all considered to be significant spectra derived from one component are arranged in the spectrum display area 63. Therefore, the analysis operator does not need to check the $MS^4$ spectrum from which no significant information can be obtained. The decrease in the number of mass spectra to be displayed within the limited space results in a larger display area assigned to each mass spectrum, making the individual mass spectra easier to view.

In the previous embodiment, the operation of acquiring and storing the precursor ion signal intensity value, TIC value and BPC value is performed in the process of collecting data by DDA. This is to simplify the process of analyzing the data. Needless to say, it is possible to perform only the collection of the measurement data in the process of collecting data by DDA, in which case the precursor ion signal intensity value, TIC value, BPC value, and the like can be calculated based on the measurement data in the process of analyzing the data.

The information stored in the spectrum display condition storage section 26 can be retrieved for use at any point in time. Therefore, it may be used when a set of previously collected data is once more analyzed. It may also be reused as the precursor ion selection condition for the collection of a new set of data.

The previously described embodiment is concerned with the case where the present invention is applied in the processing of the data collected with an LC-MS. It is evident that the present invention can also be applied in the processing of the data collected with a GC-MS. The present invention can also be applied in an independent mass spectrometer which is not combined with an LC or GC.

The previous embodiment and its variations are mere examples of the present invention. It is evident that any change, modification or addition appropriately made within the spirit of the present invention will also fall within the scope of claims of the present application.

REFERENCE SIGNS LIST

1 . . . Measurement Unit
11 . . . LC Unit
12 . . . MS Unit
2 . . . Controlling-Processing Unit
21 . . . Mass Spectrum Creator
22 . . . TIC/BPC Acquirer
23 . . . Measurement Data Storage Section
24 . . . Data Analysis Window Display Processor
25 . . . Spectrum Display Condition Setter
26 . . . Spectrum Display Condition Storage Section
27 . . . Spectrum Judgment Section
28 . . . Analysis Controller
281 . . . DDA Execution Controller
282 . . . Precursor Selector
283 . . . Precursor Selection Information Storage Section
29 . . . Central Controller
3 . . . Input Unit
4 . . . Display Unit
50 . . . Spectrum Display Condition Setting Window
51 . . . Precursor Ion Intensity Threshold Setting Area
52 . . . Product Ion Intensity Threshold Setting Area
521 . . . Radio Button
61 . . . Chromatogram Display Area
62 . . . Spectrum Tree Display Area
63 . . . Spectrum Display Area

The invention claimed is:

1. A mass spectrometer capable of data dependent acquisition in which an $MS^m$ spectrum is acquired by performing an $MS^m$ analysis using, as a precursor ion, a specific ion observed on an $MS^{m-1}$ spectrum acquired by an $MS^{m-1}$ analysis, where m represents all integers ranging from two to n, where n is an integer equal to or greater than two, and the mass spectrometer comprising:

a) a display condition storage section configured to store, as a filtering condition for a spectrum display, a judgment condition concerning one or both of a signal intensity of the precursor ion observed on the $MS^{m-1}$ spectrum for the $MS^m$ analysis and a signal intensity of all or some of product ions observed on the $MS^m$ spectrum;

b) a judgment section configured to determine, for each of one or more $MS^m$ spectra originating from one component created from data collected by data dependent acquisition, whether or not the signal intensity of the precursor ion and/or the product ions satisfies the judgment condition stored in the display condition storage section;

c) a spectrum display processor configured to display, in an arrayed form on a same display area, $MS^m$ spectra originating from one component which have been judged by the judgment section as satisfying the judgment condition; and d) a characteristic value storage section configured to calculate a signal intensity value of the precursor ion, a total value of the signal intensities of all product ions observed on an $MS^m$ spectrum, and a signal intensity value of an ion which is a base peak observed on the $MS^m$ spectrum, and configured to store the calculated values, based on the acquired data during a data collection by data dependent acquisition, wherein:

the signal intensity of all or some of the product ions observed on the $MS^m$ spectrum is a total value of signal intensities of all product ions observed on the $MS^m$ spectrum, or a signal intensity value of an ion observed as a base peak on the $MS^m$ spectrum, and the judgment section is configured to use the values stored in the characteristic value storage section in determining whether or not the signal intensity of the precursor ion and/or the product ions satisfies the judgement condition.

2. The mass spectrometer according to claim 1, further comprising:

an input unit configured to allow an analysis operator to enter the judgment condition concerning one or both of the signal intensity of the precursor ion observed on the $MS^{m-1}$ spectrum for the $MS^m$ analysis and the signal intensity of all or some of the product ions observed on the MS$^m$ spectrum, wherein the judgment condition entered through the input unit is stored in the display condition storage section.

3. The mass spectrometer according to claim 2, wherein: a liquid chromatograph or gas chromatograph is connected in a previous stage of the mass spectrometer.

4. The mass spectrometer according to claim 1, wherein: a liquid chromatograph or gas chromatograph is connected in a previous stage of the mass spectrometer.

5. The mass spectrometer according to claim 1, wherein: the judgment condition is individually set for each of the MS$^m$ spectra originating from a different component obtained by the data dependent acquisition.

6. The mass spectrometer according to claim 1, wherein: the spectrum display processor is configured to display a spectrum tree which is a tree structure showing a data dependent acquisition execution condition and a relation of the data collected by the data dependent acquisition.

* * * * *